Dec. 2, 1969  D. VOGELSBERG  3,481,127
APPARATUS FOR MANUFACTURING LAY-REVERSED COMMUNICATION CABLE
Filed Nov. 21, 1967  3 Sheets-Sheet 1
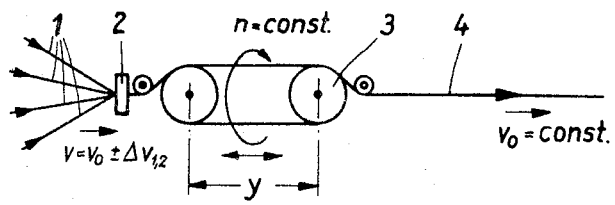
*Fig. 1*
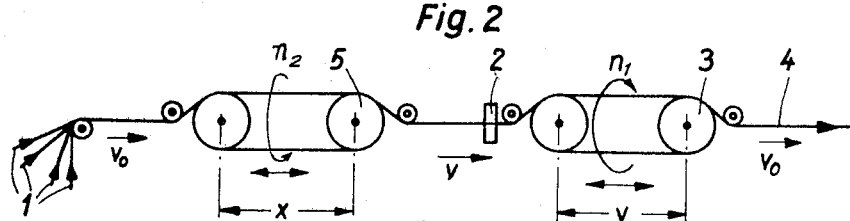
*Fig. 2*
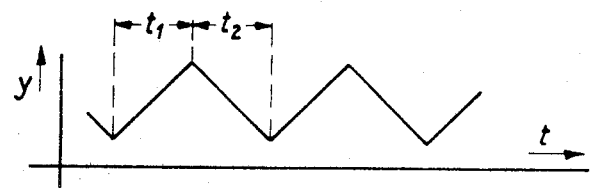
*Fig. 3*
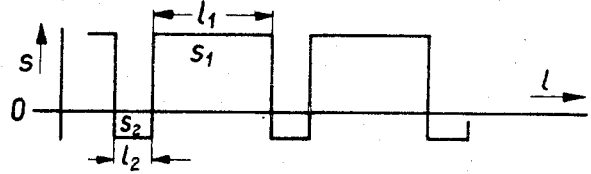
*Fig. 4*
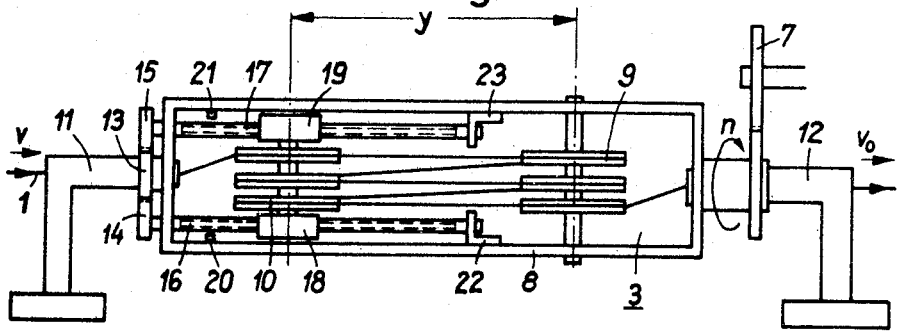
Inventor:
Dieter Vogelsberg Dec. 2, 1969   D. VOGELSBERG   3,481,127
APPARATUS FOR MANUFACTURING LAY-REVERSED COMMUNICATION CABLE
Filed Nov. 21, 1967   3 Sheets-Sheet 2

Inventor:
Dieter Vogelsberg

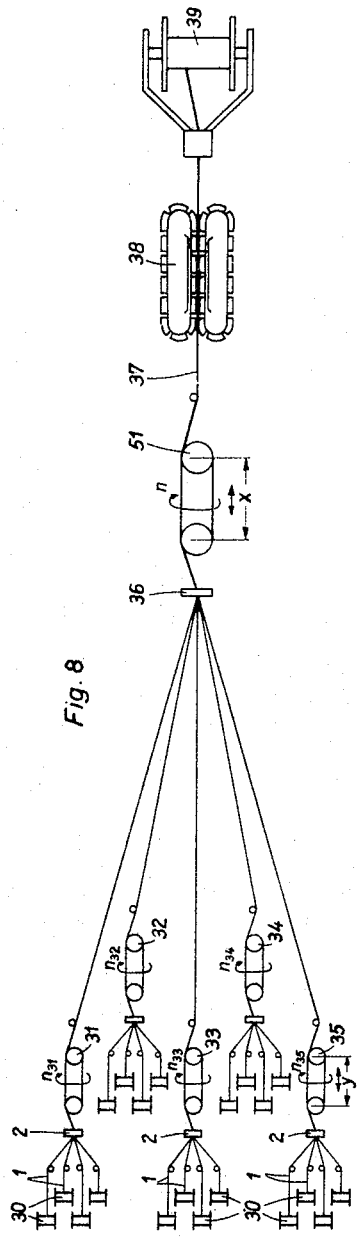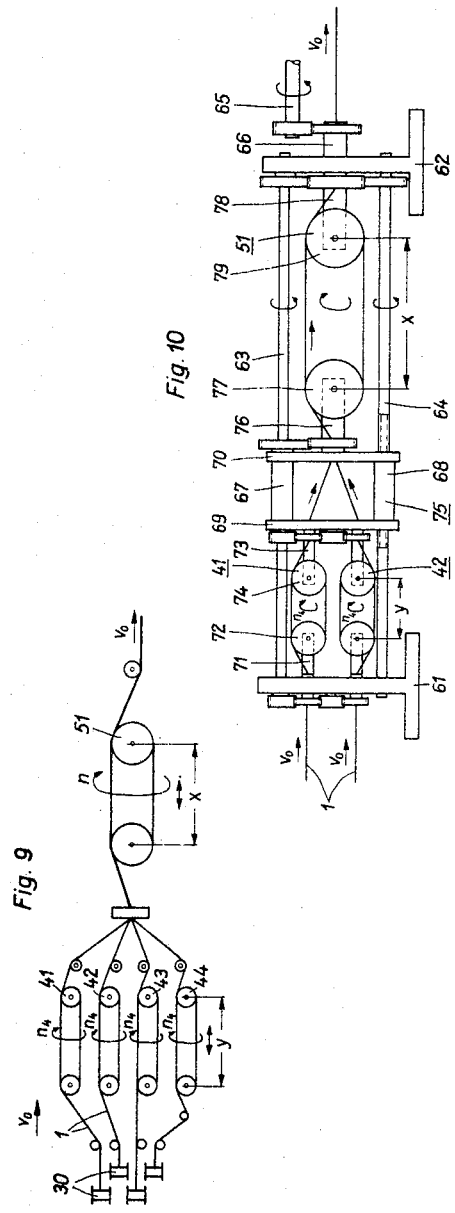

United States Patent Office 3,481,127
Patented Dec. 2, 1969

3,481,127
APPARATUS FOR MANUFACTURING LAY-REVERSED COMMUNICATION CABLE
Dieter Vogelsberg, Berlin, Germany, assignor to Siemens Aktiengesellschaft, Berlin, Germany, a corporation of Germany
Filed Nov. 21, 1967, Ser. No. 684,803
Claims priority, application Germany, Dec. 16, 1966, S 107,460; May 24, 1967, S 109,994; June 30, 1967, S 110,591
Int. Cl. D01h *13/26, 13/02, 7/02*
U.S. Cl. 57—34     4 Claims

ABSTRACT OF THE DISCLOSURE

An apparatus for manufacturing lay-reversed communication cable wherein the elements of a given cable group are uniformly twisted in one direction along a given section of the group, in an opposite direction along the next section of the group, and so on throughout the entire length of the cable group. The cable elements which are to be cabled in a lay-reversed manner from one cable group into the next-higher cable group are fed respectively at predetermined angles to a rotary cabling device which rotates in only one direction and which is provided with an intermediate accumulator at which the elements are accumulated and from which the elements are withdrawn while being twisted. During the rotation of the cabling device the extent to which the elements are accumulated at the intermediate accumulator is continuously changed in a manner alternately increasing and decreasing the extent of accumulation of the elements at the intermediate accumulator according to the lengths of the successive sections of uniform but mutually reversed twist of the next-higher cable group. The cabling device includes a rotary means which continuously rotates in one direction and which carries a variable accumulator means for rotation therewith. A control means coacts with the continuously rotating variable accumulator means for continuously changing the extent of accumulation of the elements at the accumulator means in a manner which alternately increases and decreases the extent of accumulation.

---

My invention relates to a method and device for manufacturing lay-reversed communication cable wherein the elements of one cable group when formed into the next-higher cable group will provide the latter with successive uniformly twisted sections which have their directions of twist successively reversed from one to the next.

Recent developments in the manufacture of communication cable have been directed toward combining into a single operation separate cabling operations which previously were performed separately. For example, it has been customary in the past two twist individual conductors into pairs or quads, forming one cable group, and then this latter cable group, in an entirely separate operation, was stranded into a unit forming the next-higher cable group. However, recent developments have been directed toward combining operations of this latter type into a single operation, so as to decrease manufacturing costs. In order to manufacture lay-reversed communication cable in this way, it is necessary to provide cabling operations which will alternately provide the cable elements with opposed directions of twist, namely a right or Z-twist and a left or S-twist. Cabling operations of this type, referred to as lay-reversed cabling operations, have the advantage of making it possible to supply the elements from stationary sources and to carry out further operations on the cabled elements with devices which also need not be rotated. Of particular advantage with respect to the electrical qualities of the finished cable are lay-reversed cabling methods or devices which have an intermediate accumulator capable of bringing about a periodic change in the direction of twist at relatively large distances which may, for example, be on the order of 10 m.

For example, one construction for carrying out lay-reversed cabling in this way is disclosed in U.S. Patent 3,169,360, where the elements of the cable are indeed supplied from stationary sources and are cabled by means of a rotary intermediate accumulator having a pair of rolls, respectively provided with axes which extend transversely to the direction of travel of the cable elements. At the latter rolls of the intermediate accumulator a section of the cable which is to have a uniform twist in one direction is accumulated and is then withdrawn with a change in the direction of rotation of the intermediate accumulator. It has also been proposed to feed the elements of the cable to the intermediate accumulator in a double-lay and also to withdraw the elements in a double-lay, by rotating about the intermedate accumulator one or more cabling bails. In this way there is an appreciable reduction in the magnitude of the masses which must be braked and accelerated at the points of twist reversal.

With these known lay-reversed cabling methods the elements which are to be cabled are fed at predetermined angles to a rotary cabling device which has an intermediate accumulator, and the cabled elements are withdrawn during the cabling operations also at a predetermined angle. In this way elements which form one cable group are cabled into the next-higher cable group which has sections $l_1$ respectively provided with a twist $s_1$ and respectively alternating with sections $l_2$ respectively provided with a twist $s_2$ which has a direction of twist which is the reverse of the twist $s_1$. The absolute value $|s_1|$ or $|s_2|$ determine the twist length while the sign of $s_1$ or $s_2$ is indicative of the direction of twist. Each section $l_1$ and $l_2$, which alternate with each other to make up the next-higher cable group, contains a number $p$ of twist convolutions, so that $$l_1 = p \cdot s_1 \qquad (1)$$
$$l_2 = -p \cdot s_2 \qquad (2)$$

Thus, it will be seen that the ratio of sections $l_1/l_2$ or the ratio of twists $s_1/s_2$ is $$\frac{l_1}{l_2} = -\frac{s_1}{s_2} \qquad (3)$$

Lay-reversed cabling methods of this type have, however, a disadvantage in that the sections $l_1$ and $l_2$ of this next-higher cable group must always be equal to each other. It follows, therefore, from Equation 3, that $$s_1 = -s_2 \qquad (4)$$

so that $$|s_1| = |s_2|$$

Therefore, with lay-reversed cabling of the above type the cable groups which are manufactured have successive sections whose twist lengths are equal to each other. It is therefore not possible with such known methods and devices to manufacture a lay-reversed cable group having successive sections which are alternately provided with twists of unequal magnitudes.

This later limitation of the known methods and devices is a disadvantage in that as a general rule a lay-reversed cabling operation is immediately followed by a continuously operating further cabling operation having a constant twist direction characterized by the twist $s_3$ of the next-higher cable group. The effective twists $s_1''$ and $s_2''$ of this latter cable group have the following relationships:

$$s_1'' = \frac{s_1 \cdot s_3}{s_1 + s_3} \qquad (5)$$

and $$s_2'' = \frac{s_2 \cdot s_2}{s_2 + s_3} \qquad (6)$$

Therefore, a cable group manufactured according to a lay-reversed method as referred to above provides, as may be seen in connection with Equation 4

$$s_2'' = \frac{s_1 \cdot s_3}{s_1 - s_3}$$

so that $$s_1'' \neq s_2''$$

In many cases, such as for example with cable bunches composed of bunches of lower and higher cable groups, it is desired for manufacturing reasons to provide twist lengths $|s_1|$, $|s_2|$ and $|s_3|$ of the same order of magnitude. In this case there are effective twists $s_1''$ and $s_2''$ which differ in magnitude from each other by practically one or more orders of magnitude.

On the other hand, it is known that in determining the different twists of a communication table it is necessary to fulfill widely differing requirements. These are, for example, crosstalk conditions, mechanical properties, manufacturing techniques, and installation conditions. For a given cable group it is sufficient in most cases to provide a predetermined single effective twist which will adequately fulfill all requirements. If the cable group has different twists, which differ from each other by a given multiple, then it is in general not possible to provide optimum dimension values for both twists. Therefore, it is necessary to take into account the fact that with the above-mentioned known lay-reversed cabling methods and devices, as compared to conventional continuous cabling methods and devices which have only a single constant direction of twist, certain technical drawbacks will be encountered with respect to crosstalk conditions, mechanical properties, or installation conditions.

It is accordingly a primary object of my invention to provide a lay-reversed cabling method and apparatus which will avoid the above difficulties.

Thus, one of the more specific objects of my invention is to provide a method and device which do not require a change in the direction of rotation of the cabling device so that the latter can continuously rotate at a constant speed, thus eliminating the necessity for braking structures and for accelerating structures to act on the masses which rotate about the cabling axis.

In addition, it is an object of my invention to provide a method and apparatus which makes it possible to combine into one operation operations which previously were performed separately.

It is also an object of my invention to provide a method and apparatus which will produce in a given cable group preselected twist lengths for successive sections of the cable in such a way that during further cabling operations the effective twist length has a single value over the entire length of the manufactured cable group.

In accordance with my invention, the elements which are to be cabled from one cable group into the next higher cable group are directed at predetermined angles, respectively, to a rotary cabling device which is provided with an intermediate accumulator from which the cabled elements are withdrawn also at a predetermined angle. In accordance with my invention the elements are accumulated at the intermediate accumulator, from which they are withdrawn and twisted while the cabling device continues to rotate in a single direction of rotation, in a manner according to which the extent of accumulation constantly changes with increases in the extent of accumulation respectively alternating with decreases in the extent of accumulation of the elements at the accumulator. The extent to which the elements are accumulated at the accumulator is varied in accordance with the lengths of the sections of the finished cable group which respectively have twists of a constant direction, and preferably there are periodic reversals between the increases and decreases in the extent of accumulation of elements at the variable accumulator. Thus, the cabling device itself is continuously rotated in one direction at a constant speed, so that braking and repeated acceleration of rotary masses are unnecessary. The different twist properties of the successive sections of the finished cable group are achieved according to my invention only through the continuous changing of the extent of accumulation of the elements at the variable accumulator which forms part of the cabling device. As a result of the continuous increase or decrease in the extent of accumulation of elements at the accumulator, the speeds with which the cabled elements, as seen in the cabling direction, pass through the cabling points situated respectively ahead of and subsequent to the intermediate accumulator are different from each other. Although the elements which are cabled are cabled a second time upon being withdrawn from the intermediate accumulator as a result of the unidirectional constant rotary movement of the cabling device, there is a resulting twist in the finished cable group in one or the other direction according to whether the extent of accumulation of the elements at the variable accumulator is increased or decreased.

Because the method and device of my invention provides lay-reversed cabling where the elements which are to be cabled are fed at predetermined angles to the device while the finished cable group is withdrawn from the device in the same way, it is possible to combine several cabling operations into a single operation one after the other. Thus, the elements which are to be cabled according to the method and device of my invention can, for example, be withdrawn from conductor supply devices having stationary axes of rotation, respectively. It is also possible, however, to feed these elements from a cabling machine located ahead of the structure of my invention which performs the method thereof, inasmuch as these elements may initially take the form of elements which have already been previously cabled into a given cable group such as quads, groups of eight cabled elements, stranded units, or the like. Thus, whatever the particular cable group which is acted upon by the method and device of my invention, this particular group will be cabled into the next higher group.

Above all, it becomes possible with the method and device of my invention to select the twist lengths of the successive sections in such a way that during the further cabling the effective twist length over the entire length of the manufactured cable group has a single value. This result can be achieved with my invention because the lengths of the successive sections of respectively different twists can have any selected values. In order to bring about the transition of one section of a given constant twist direction to the next section which has an opposed twist direction, it is only necessary with the method and device of my invention to provide a single reversing operation during which the direction of change in the extent of accumulation at the accumulator is reversed, so that, for example, the extent of accumulation changes from a continuously increasing value to a continuously decreasing value or from a continuously decreasing value to a continuously increasing value.

My invention is illustrated by way of example in the accompanying drawings which form part of this application and in which:

FIG. 1 is a schematic illustration of a variable accumulator of my invention which has a continuously changing extent of accumulation in order to carry out the lay-reversed cabling of my invention;

FIG. 2 is a schematic illustration of how a pair of variable accumulators which have continuously changing extents of accumulation are combined so as to achieve at the entrance and at the exit of the device the same speed $v_0$ for the individual cable elements;

FIG. 3 is a graphic illustration of the relationship between the distance $y$, between the axes of rollers of the intermediate accumulator and time as well as the relationship between the twist $s$ and the length $l$ of a manufactured cable group;

FIG. 4 is a schematic illustration of one possible embodiment of an intermediate accumulator of my invention;

FIG. 8 is a schematic illustration of a plurality of parallel connected intermediate accumulators together with an additional variable accumulator according to which the parallel-connected variable accumulators cable elements into one cable group, and this latter group is then cabled into the next-higher cable group by the additional intermediate accumulator;

Figure 5:
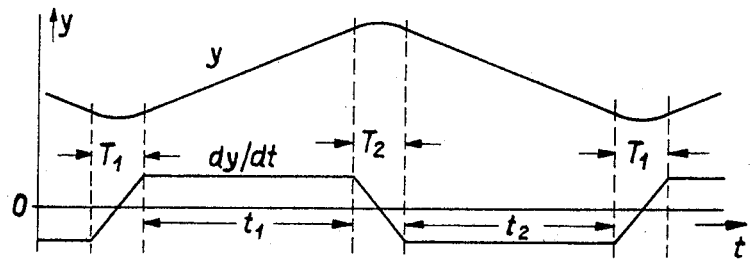
FIG. 5 is a graph illustrating the relationship between the distance $y$, between the roller axes of the variable accumulator, and the differential quotient $dy/dt$ with respect to time where the reversal times change constantly.

FIG. 9 schematically illustrates an arrangement of parallel-connected intermediate variable accumulators together with an additional accumulator where the individual conductors which are to be cabled are provided with an initial torsion; and FIG. 10 is a partly schematic but more constructive illustration of the structure of FIG. 9.

Referring now to the schematic illustration in FIG. 1, the principle of my invention is illustrated therein. The elements 1 which are to be cabled are fed at predetermined angles, shown at the left in FIG. 1, to the twisting nipple 2. Thus, these elements 1 may be supplied, for example, from supply drums having stationary axes of rotation, from suitable spools, or even from individual containers such as pail packs. However, they can also be derived from a cabling machine which is situated in advance of the structure shown in FIG. 1. From the twisting nipple 2 the elements are fed to the intermediate accumulator means 3 which is shown as having the schematically illustrated sets of sheaves or rollers which respectively have parallel axes and which rotates at the constant angular speed $n$, the cable being withdrawn from the right end of the variable accumulator means 3 by an unillustrated pulling device in the form of the finished cable group 4 which travels to the right, as viewed in FIG. 1, at the constant speed $v_0$. The distance $y$ between the parallel axes of the sets of sheaves of the variable accumulator means 3 can be changed so that the extent of accumulation of cable elements at the accumulator 3 can be continuously increased or decreased, as indicated by the double-headed arrow in FIG. 1.

As a result of the constant angular speed of rotation $n$ of the intermediate accumulator means 3, the elements 1 are twisted at a cabling point situated at the twisting nipple 2 and they are again twisted or cabled upon leaving the intermeditae accumulator means 3. Since, however, as a result of the continuous increase or decrease in the extent to which elements are accumulated at the intermediate accumulator 3, the speed $v$, with which the elements 1 travel through the twisting nipple 2, is different from the constant withdrawal speed $v_0$ at the discharge end of the intermediate accumulator 3, so that there will remain a resultant twist $s$.

If the extent of speed change resulting from the continuous change in the extent of accumulation of elements at the intermediate accumulator 3 is $\Delta v_1$ during an increase in the extent of accumulation and $\Delta v_2$ during a decrease in the extent of accumulation at the variable accumulator of my invention, then the speeds $v_1$ and $v_2$, with which the elements 1 enter the twist nipple 2 will be $$v_1 = v_0 + v_1 \qquad (7)$$
$$v_2 = v_0 - v_2 \qquad (8)$$

If the time period during the increase in the extent of accumulation at the accumulator is $t_1$ and the time period during the decrease in the extent of accumulation at the variable accumulator is $t_2$, then it is possible to determine from the speeds $v_1$ and $v_2$ the lengths $l_1$ and $l_2$ of the successive sections of different twist, according to the relationship:

$$l_1 = v_1 . t_1 = (v_0 + \Delta v_1) . t_1 \qquad (9)$$
$$l_1 = v_2 . t_2 = (v_0 - \Delta v_2) . t_2 \qquad (10)$$

For a twist $s_1$ of the section having a length $l_1$, there will be $$\frac{l}{s_1} = \frac{n}{v_0} - \frac{n}{v_0 + \Delta v_1}$$

so that $$s_1 = \frac{v_0}{n} \cdot \frac{v_0 + \Delta v_1}{\Delta v_1} \qquad (11)$$

In a corresponding manner the twist $s_2$ of a cable section having a length $l_2$ will be $$s_2 = -\frac{v_0}{n} \cdot \frac{v_0 - \Delta v_2}{\Delta v_2} \qquad (12)$$

If, as is assumed in the schematic illustration of FIG. 1 $v_0$ is constant and $n$ is also constant, then the twists $s_1$ and $s_2$ of the finished cable group 4 at the discharge of the accumulator 3 depend only upon the magnitude of the speed at which the extent of accumulation at the accumulator 3 is changed. The values of twists $s_1$ and $s_2$ of successive cable sections having lengths $l_1$ and $l_2$ can, therefore, be selected at any desired magnitudes. In carrying out my invention, however, it is preferred to provide these twists with magnitudes having a value which will provide an effective twist at the next-higher cable group which is the same over the entire length of this next-higher cable group.

In order to carry out my invention the variable accumulator means, as schematically shown in FIG. 1, can rotate so that as a result of its own rotary movement the twisting or cabling of the elements which are to be cabled is produced.

In order to make it possible to reduce the magnitude of the rotary masses and thus to achieve a higher manufacturing speed, it is preferred in carrying out my invention, to provide the intermediate variable accumulator means which has the constantly changing extent of accumulation with a stationary axis of rotation while the elements which are cabled are fed to and withdrawn from the cabling device by means of rotary bails. Preferably the elements which are to be cabled are supplied to and withdrawn from the device in a double-lay in a manner which in and of itself has already been proposed for lay-reversed cabling.

As is apparent from the schematic illustration of my invention shown in FIG. 1, the speed with which the elements 1 are fed to the accumulator changes depending upon the speed of change of the extent of accumulation of the elements at the intermediate accumulator means 3, since the speed at which the elements are fed to the device equals the speed of approach $v$ of the elements 1 into the twisting nipple 2. The elements which are to be operated on in the manner illustrated in FIG. 1 are taken from rotary frames provided, for example, with practically inertia-free drives which are regulated over the tension stresses in the elements.

Inasmuch as the latter conditions will in general not prevail, it is preferred to carry out the method of my invention with an arrangement where the elements which are cabled are directed, either before or after one variable accumulator means through a second variable accumulator means connected in series with this one variable accumulator means, with the speeds with which the extents of accumulation at the pair of accumulator means continuously change being opposed to each other and with the relative angular speed of rotation of one variable accumulator with respect to the other being different from zero. In this way it is possible to feed the elements which are to be cabled to the structure at the same speed as that which the finished cable group is withdrawn from the structure.

With an arrangement of this latter type where a pair of variable intermediate accumulators have continuously changing but opposed extensive accumulation, it is only necessary that the magnitude or direction of the angular speed of rotation with which the pair of accumulators respectively rotate, i.e., their angular velocity be different from each other. This relative angular speed of one of the accumulators with respect to the other will then be a determining factor of the cable.

In order to explain this relationship reference is made to FIG. 2 where such an embodiment of my invention is schematically illustrated. With this arrangement the elements 1 are fed at predetermined angles initially to the additional intermediate variable accumulator 5 which is situated in the example of FIG. 2 in advance of the variable accumulator 3, this accumulator 5 having in the same way as the accumulator 3 the schematically illustrated sets of sheaves which respectively have parallel axes situated from each other by the distance $x$ indicated in FIG. 2. This distance $x$ between the axes of the sets of sheaves of the intermediate accumulator 5 is changed so that the extent of accumulation at the intermediate accumulator 5 is continuously increased or decreased, as indicated by the double-headed arrow in FIG. 2. When the elements 1 leave the intermediate accumulator 5, they are received at the twisting nipple 2 from which they travel to the intermediate accumulator means 3 which is of the same construction as and operates in the same way as the intermediate accumulator means 3 of FIG. 1.

It is assumed that with the embodiment of FIG. 2 the additional intermediate accumulator means 5 rotates at the angular speed $n_2$, while the accumulator means 3, on the other hand, rotates at the angular speed $n_1$.

It is essential for the embodiment of FIG. 2 that the speed of change of accumulation at the accumulator 5 brought about by changing the distance $x$ and the speed of change of accumulation at the accumulator 3, brought about by changing the distance $y$ be opposed to each other. In this way, the speed with which the cable elements are fed to the initial intermediate accumulator 5 is equal to the speed $v_0$ with which they are withdrawn from the accumulator 3, while the elements 1 travel through the distributor disc 6 and the twisting nipple 2 with a speed $v$ which differs from the speed $v_0$ according to the amounts $\Delta v_1$ or $\Delta v_2$ determined by the extents of accumulation at the accumulators 3 and 5, respectively.

The desired change of extent of accumulation of the accumulators 3 or 5 can be achieved by regulating the distance $x$ between the shafts of the accumulator 5 or the distance $y$ between the shafts of the accumulator 3 according to a predetermined program with a suitable control means. Where this latter distance between the shafts of one of the accumulators is changed according to such a program, then the other accumulator should be provided a construction according to which the distance between its shafts automatically changes, for example, either as a result of gravitational forces or as the result of a spring structure which acts on these shafts.

Assuming, for example, that the distance $y$ between the shafts of sheaves of the intermediate accumulator 3 is continuously changed by a control means which provides a periodically reversing linear increase or decrease in the extent of accumulation, then this distance $y$ will continuously change in accordance with time $t$ as graphically illustrated at the upper graph of FIG. 3. During the time period $t_1$ the distance $y$ increases linearly, so that the extent of accumulation at the intermediate accumulator 3 increases. During the next following time period $t_2$, the distance $y$ decreases linearly, so that the extent of accumulation at the intermediate accumulator 3 diminishes. By way of a corresponding construction of the intermediate accumulator 5, the distance $x$ between the shafts of the sets of sheaves thereof will undergo, under the action of gravitational forces, for example, an increase or a decrease providing a corresponding increase or decrease in the extent of accumulation at the accumulator 5 which is opposed to the extent of accumulation at the accumulator 3. For this purpose the intermediate accumulator 5 can, for example, have a so-called dancer roll set which gravitationally moves up and down in opposition to the manner in which the distance $y$ changes.

In the event that the time periods $t_1$ and $t_2$ are chosen so as to be equal to each other, as illustrated in FIG. 3, then $$t_1 = t_2$$

and if the change of speed of the intermediate accumulator 3 is determined according to $$\Delta v_1 = \Delta v_2 = 0.5 \ v_0 \tag{13}$$

then it follows, according to Equations 9 and 10 that $$\frac{l_1}{l_2} = -\frac{s_1}{s_2} = 3.0 \tag{14}$$

The manner in which the twist $s$ changes depending upon the length $l$ of the manufactured next-higher cable group, according to this latter equation, is illustrated at the lower graph of FIG. 3.

As a rule there will be connected to the end of the structure which carries out the lay-reversed cabling method a further structure providing a further cabling operation having a constant direction of twist, and by means of which the manufactured cable group will be further cabled to a group of the next-higher order having a twist $s_3$. The magnitude of the resulting effective twists $s_1''$ and $s_2''$ are given in the above Equations 5 and 6. Inasmuch as the method and device of my invention make it possible to provide twists $s_1$ and $s_2$ of the lay-reversed cable group 4 which are of different magnitudes, it is preferred to select the twists in such a way that $$s_3 = -2 \cdot \frac{s_1 \cdot s_2}{s_1 + s_2} \tag{15}$$

so that the oppositely directed effective twists $s_1''$ and $s_2''$ which are of the same magnitude and which form the next-higher cable group provide:

$$s_1'' = -s_2'' = 2 \cdot \frac{s_1 \cdot s_2}{s_2 - s_1} \tag{16}$$

Thus, the method and device of my invention make it possible to manufacture lay-reversed cable groups which can be followed by a further cabling operation having a constant direction of twist and providing only a single effective twist length $s_1' = s_2''$.

In order to carry out my invention, it is essential that the intermediate accumulator means to which the cable elements are fed and from which they are withdrawn have a changing extent of accumulation thereon. A particularly favorable construction of such an intermediate accumulator means is provided in the case where, as already indicated schematically in FIGS. 1 and 2, the intermediate accumulator means is composed of a plurality of sheaves around which the cabling elements are guided and which are arranged on a pair of shafts which are situated from each other by a distance which can be changed.

By way of further explanation there is illustrated in FIG. 4 an embodiment of such an intermediate accumulator means which is provided with the angular speed of rotation $n$, so that the construction of FIG. 4 can be used as the accumulator means 3 or 5 in the schematic illustration of FIG. 2.

The intermediate accumulator means which is shown in FIG. 4 is illustrated as a sheave-type of accumulator having three windings. The frame 8 which is shown in FIG. 4 rotates at a constant angular speed $n$, this rotation being derived from the drive 7. Thus, at its right end the frame 8 is fixed to a rotary sleeve supported for rotation on a bearing element 12 and carrying a gear which meshes with the gear drive 7 driven from any suitable motor or the like so as to provide the constant speed of rotation $n$ for the frame 8. At its left end, as viewed in FIG. 4, the frame 8 is supported for rotary movement on a bearing element 11. These bearing elements 11 and 12 are stationary. The frame 8 carries one set of three sheaves 9 supported for rotary movement by way of a shaft which extends coaxially through the sheaves 9 and which is directly carried by the frame 8, so that the axis of rotation of the set of sheaves 9 remains stationary with respect to the frame 8. Three sheaves 10 form the second set of sheaves of the illustrated variable accumulator means, and this second set of sheaves are carried by a common coaxial shaft which is shiftable longitudinally of the frame 8 to the right and left, as viewed in FIG. 4. The bearing elements 11 and 12 are formed with coaxial bores passing therethrough and through which the elements 1 which are to be cabled are fed with the speed $v$ in the case of element 11 and with the output speed $v_0$ in the case of element 12. After reaching the interior of frame 8 the elements 1 are wound in three windings about the sheaves 9 and 10, as indicated in FIG. 4. Thus, after these elements have passed in three windings around the two sets of sheaves they leave through the bore of bearing 12 at the speed $v_0$.

A gear 13 is fixed to the bearing element 11 and meshes with a pair of gears 14 and 15 which are respectively fixed coaxially to a pair of rotary spindles 16 and 17 which extend rotatably through left end of the frame 8, as viewed in FIG. 4, and which are supported for rotation at their right ends by way of angle brackets 22 and 23, respectively, which are carried by the frame 8. Thus, as a result of the rotary movement of the frame 8 the pair of spindles 16 and 17 will be rotated about their own axes, while rotating with the frame 8 about the stationary gear 13 which meshes with the gears 14 and 15, and thus, the spindles 16 and 17 will rotate with respect to the frame 8. These spindles are provided with oppositely directed worm-thread drives or the like, respectively.

The threads of spindle 16 coact with a transmission member 18 which carries one end of the shaft of the set of sheaves 10, while the oppositely threaded spindle 17 coacts with a transmission element 19 to which the other end of this shaft is connected. One or the other of the transmission elements 18 and 19 is operatively connected at any given instant with one or the other of the spindles 16 or 17, respectively, so that in any given instant the extent of accumulation is increasing or decreasing.

Transmission element 18 is connected to spindle 16 simultaneously with the disconnection of element 19 from the spindle 17 and when element 19 is connected to spindle 17 element 18 is disconnected from spindle 16. This connection and disconnection of the transmission elements 18 and 19 to and from the spindles with which they respectively coact is brought about, in a manner which is not specifically illustrated in detail, by engagement of elements 18 and 19 when travelling to the left, as viewed in FIG. 4, with the stop elements 20 and 21 carried by the frame 8, respectively, and by engagement of elements 18 and 19 when traveling to the right, as viewed in FIG. 4, with the angle brackets 22 and 23, respectively. In an unillustrated manner suitable mechanical devices are provided for providing a mechanical coupling and uncoupling of the elements 18 and 19 with the oppositely threaded spindle 16 and 17. Thus, when the set of sheaves 10 reach the stops 20 and 21, the direction of longitudinal travel along the frame 8 is reversed, and a second reversal takes place when they reach the angle brackets 22 and 23, and no outside controls are required for this purpose.

If desired, element 19 can be in the form of a simple sleeve which slides along element 17 which in this case is a simple guide rod extending slidably through such a sleeve 19, and element 18 may carry a pin which is received in the threads of spindle 16. In this case spindle 16 is provided with a pair of cross threads of opposite directions extending along the spindle 16 and joining each other at their ends so that such a pin of such an element 18 upon reaching the end of one thread will be automatically received in the other thread to be advanced in the opposite direction along the spindle, and in this way also it is possible to provide automatically reversed directions of movement of the set of sheaves 10.

With an arrangement as shown in FIG. 4, however, it is possible through suitable unillustrated control elements to bring about a reversal in the direction of movement of elements 18 and 19 at any desired location.

In accordance with a further feature of my invention it is preferred to provide a change in the speed of the extent of accumulation at the intermediate accumulator even during the actual reversal so that the change in extent of accumulation continues during reversal in a fully continuous manner. In this way mechanical stresses which act in the form of tensioning of the individual cable elements during reversal are reduced to an extent which will prevent any damaging of these elements.

An explanation of this type of operation is illustrated in FIG. 5 where at the upper curve the change of the distance $y$ between the shafts of the accumulator is illustrated so as to produce the continuously changing increase or decrease in the extent of accumulation. Thus, this behavior corresponds to the illustration of FIG. 3. During the time period $t_1$ the distance $y$ increases linearly so that the extent of accumulation continuously increases while during the time period $t_2$ the distance $y$ decreases linearly, so that the extent of accumulation at the accumulator also decreases.

The reversals in the linear changes of the distance $y$ is not abrupt but these reversals are brought about during the time periods $T_1$ and $T_2$ indicated in FIG. 5, and these latter time periods are especially selected so as not to be too small. Thus, when conductors having conducting diameters of 0.4–0.8 mm. are cabled together to form a star quad, for example, it has proved to be advisable to provide time periods $T_1$ and $T_2$ which are approximately equal to ten per cent of the time periods $t_1$ and $t_2$. In this way there is provided the speed change $dy/dt$ of the intermediate accumulator means indicated at the lower part of FIG. 5.

In order to achieve this operation where the speed of change of the extent of accumulation at the intermediate accumulator continuously changes even during reversal, the change in the distance between the shafts of the sets of sheaves is brought about by providing the threads of the spindles with a pitch which at the region of the reversal points linearly decreases in proportion to the distance from these reversal points. Thus, in the case of FIG. 4 the pitch of the threads of the spindles 16 and 17 decreases linearly with the local coordinates at the region of the stops 20 and 21, on the one hand, and at the region of the angle brackets 22 and 23 on the other hand.

Figure 6:
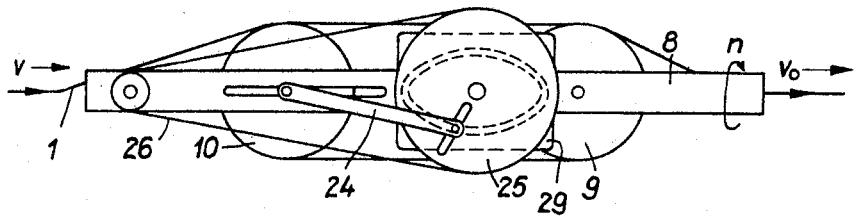
FIG. 6 is a schematic side elevation of another embodiment of a variable intermediate accumulator according to my invention.
Figure 7:
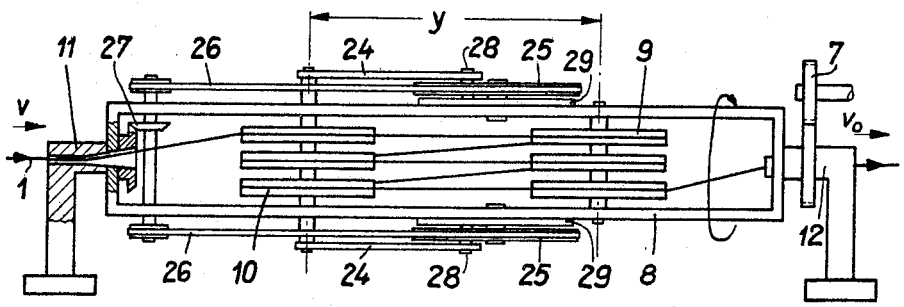
FIG. 7 is a top plan view of the structure of FIG. 6.

FIGS. 6 and 7 respectively show in different views another embodiment of an intermediate accumulator means of my invention. In this embodiment the distance between the shafts of the pair of sets of sheaves is changed by means of a cam disc drive having, for example, an almost elliptical camming guide. This intermediate accumulator means is also in the form of an accumulator having sets of sheaves for providing three windings. In this case also there is an elongated frame 8 which is rotated at a constant angular speed $n$ by way of a drive 7, as was described above in connection with FIG. 4. Also in this embodiment the frame 8 carries the set of sheaves 9 on a shaft which does not move relative to the frame 8. The second set of sheaves 10 which is longitudinally shiftable along the frame 8 is carried by a shaft which extends through longitudinally extending slots formed in the opposed elongated members of the frame 8. The bearing member 11 is provided with a bore through which the elements 1 enter at the speed $v$ into the rotary intermediate accumulator means where these elements are wound in three windings on the sets of sheaves 9 and 10. Upon leaving these sets of sheaves the elements 1 move out through a bore of the bearing element 12 at the speed $v_0$.

The longitudinal movement of the set of sheaves 10 is brought about by way of a pair of push-bars 24 which are respectively situated at the exterior of the frame 8 at the opposed longitudinal sides thereof, these bars 24 being pivotally connected at one end to the opposed ends of the shaft which carries the sheaves 10. The other ends of the push-bars 24 carry cam-follower pins 28 which respectively extend through radial slots of a pair of coaxial rotary discs 25 into the substantially elliptical camming grooves which are respectively formed in a pair of opposed cam plates 29 which are respectively fixed to the opposed longitudinal sides of the frame 8. These plates 29 are situated between the frame 8 and the discs 25 which are respectively supported for rotary movement on suitable pins fixed to and projecting from the frame 8. The radially slotted discs 25 form a pair of pulleys around which a pair of endless belts 26 respectively extend, and these belts are respectively driven from the bevel-gear drive 27, shown at the left of FIG. 7, which serves to rotate a pair of coaxial pulleys around which the left ends of the belts 26 extend. The drive 27 includes a stationary bevel gear through which the bore for the elements 1 entering the accumulator coaxially extends, so that with this construction upon rotation of the frame 8 the drive 27 will produce movement of the belt 26 so as to advance the pins 28 uniformly along the cam grooves of the plates 29, thus providing reciprocating movement of the set of sheaves 10. As a result of the substantially elliptical configuration of the cam grooves of the stationary plates 29 the change in the extent of accumulation of the elements in the variable accumulator means not only is alternately increased and decreased continuously but also this change continues to take place during reversals between the increasing and decreasing extents of accumulation.

With the embodiment of my invention which is shown in FIGS. 6 and 7 the cam grooves of the plates 29 have an almost elliptical configuration. It is, however, possible to provide these cam grooves with different configurations. It is only essential that at the region of the reversal points the camming structure provides a continuous, uninterrupted camming of the followers 28.

One of the primary advantages of the method and device of my invention resides in the fact that the cabling of the elements from one cable group to the next-higher cable group and the cabling of the latter cable group into the subsequent next-higher cable group can take place in a single continuous operation. In order to provide this type of operation, where individual cable elements are twisted into quads, for example, which are then stranded into the next-higher cable unit, there is provided a number of intermediate variable accumulator means corresponding to the number of individual cable elements and operating in parallel, the cable structure which is derived from these parallel-connected intermediate accumulators then being continuously fed to an additional variable accumulator means having an extent of accumulation which continuously changes. In this manner, it is possible to provide a particularly compact assembly which combines a number of individual operations into a single operation.

A particularly favorable arrangement is provided when the continuous change in the extent of accumulation of the parallel-connected intermediate accumulators and the continuous change in extent of accumulation of the additional intermediate accumulator have with respect to each other a relationship where the speed of travel of the individual elements into the parallel-connected intermediate accumulators and the speed of travel of the cable structure from the additional intermediate accumulator are constant and equal to each other.

With an arrangement of this type, it is possible, for example, in a single operation to twist conductors into quads and then to strand the quads directly into a cable unit. An example of such an arrangement is schematically shown in FIG. 8.

Referring now to FIG. 8, the five rotary variable intermediate accumulator means 31–35 which respectively rotate at the constant angular speeds $n_{21}$–$n_{35}$ are arranged so that they operate in parallel with respect to each other. Each of these intermediate accumulator means is supplied with four conductors 1 which are respectively fed to each of these accumulator means along predetermined angular paths to a twisting nipple 2. The conductors 1 are derived from supply drums 30 which respectively have stationary axes of rotation. The intermediate accumulator means 31–35 each has a construction corresponding to the accumulator means shown in FIG. 1 and described above, so that the parallel-operating accumulator means 31–35 each have a pair of sheave sets provided with parallel shafts the distance $y$ between which is continuously changed. In this way the extent of accumulation on each of these accumulator means is continuously increased or decreased.

As a result of the constant angular speed at which the several intermediate accumulator means 31–35 rotate, the conductors 1 which are fed to each accumulator means are twisted at the twisting nipple 2 and upon leaving the particular intermediate accumulator means are again twisted. Since, as a result of the continuous increase or decrease of the extent of accumulation of the intermediate accumulator means the speed with which the conductors 1 travel through the twisting nipple 2 is different from the speed with which they leave the intermediate accumulator means, the conductors at each accumulator means 31–35 are twisted into star quads.

These star quads are all fed through the cabling disc 36 to the additional intermediate accumulator means 51 which also has a continuously changing extent of accumulation and which rotates at a constant angular speed $n$. The additional accumulator means 51 is also made up of a pair of sets of sheaves which have parallel axes situated from each other to a distance $x$ which is continuously changed, so that the extent of accumulation at the accumulator means 51 also is continuously increased or decreased. As a result of the continuous change in the extent of accumulation at the intermediate accumulator means 51 the star quads received thereby are stranded into the cable unit 37 which is withdrawn at a constant speed from the accumulator means 51 by way of a tractor-type of device 38 which delivers the unit 37 to the take-up drum 39 on which it is wound.

With the arrangement shown in FIG. 8 the change in accumulation at the intermediate accumulators 31–35 and at the additional accumulator 51, which is to say the change of the distance $y$ and of the distance $x$ have with respect to each other a relationship which results in feeding of the conductors 1 from the supply drums 30 to the twisting nipples 2 at a speed which is equal to the speed with which the cable unit 37 is withdrawn by the device 38 from the additional accumulator 51. The magnitude of the twist of the star quads issuing from the intermediate accumulators 31–35 is determined in part by the magnitude of the change in the distances $y$ and $x$, or in other words, the speed with which the extent of accumulation at these accumulators changes. An additional factor determining the magnitude of this twist is, however, the magnitude of the speeds of rotation $n_{31}$–$n_{35}$ of the intermediate accumulators 31–35, respectively. It is therefore possible by suitable control of these factors to provide for each star quad which is fed to the twisting nipple 36 a freely selectable twist which differs from the twist of the other star quads which are fed simultaneously to the twisting nipple 36 with the parallel operation indicated in FIG. 8.

Instead of providing an operation where the individual conductors are twisted into star quads and where the quads are then stranded into a unit, it is also possible to use an arrangement shown in FIG. 8 for other types of operation such as, for example, stranding star quads into units and then cabling these units into a cable core, simply by feeding star quads to the intermediate accumulators 31–35 which are arranged in parallel with respect to each other.

In the case where a plurality of intermediate accumulator means of my invention operate in parallel to form star quads, shown for the accumulators 31–35 in FIG. 8, then it is preferred to displace the points of twist reversal with respect to each other in order to provide better uncoupling. With the arrangement shown in FIG. 8 this result is achieved in a simple manner by situating the intermediate accumulator means 31–35 at the start of the operation at different positions displaced with respect to each other, as illustrated.

Where the quad-twisting is provided with conductors which are tangentially withdrawn from their supply drums, there will be in the twisted conductors torsional stresses having differences which can result in undesirably high crosstalk couplings. Moreover, the conductors maintain their respective angular positions throughout the entire length of the quad, so that symmetry errors of the conductors also are undesirable with respect to noticeable crosstalk couplings. In order to avoid these disturbing torsional stresses, only a single conductor is fed to each of the intermediate accumulators which operate in parallel. As a result of the continuous increase of decrease in the extent of accumulation of the parallel-operating intermediate accumulators there will be provided in this way a preliminary torsion in the conductors.

Such an embodiment of my invention is illustrated schematically in FIG. 9.

Referring to FIG. 9 it will be seen that four intermediate accumulator means 41–44 which have variable extents of accumulation and which have constant rotary speeds $n_4$ operate in parallel. The several intermediate accumulator means 41–44 are respectively provided with conductors 1 which are derived from supply drums 30 which respectively have stationary axes of rotation. Thus, in this case only one conductor is fed to each of the intermediate accumulator means 41–44. In the same way as in the embodiment of FIG. 8 the intermediate accumulators 41–44 are composed each of two sets of sheaves whose axes are spaced from each other by the distance $y$ which is constantly changed so that in this way the extent of accumulation at each of these intermediate accumulator means continuously increases or decreases. Inasmuch as the conductors 1 are fed to the intermediate accumulator means 41–44, respectively, at a constant speed $v_0$, these conductors pass through the twisting nipple 2, after leaving the intermediate accumulators 41–44, as a result of the continuously changing extent of accumulation at the latter intermediate accumulators, with a speed which differs from the entrance speed $v_0$ of the conductors into the accumulators 41–44, and the conductors then reach the additional intermediate accumulator 51 which rotates at a constant speed $n$ and which has a construction identical with that described above in connection with FIG. 1.

The distances $y$ between the sets of sheaves of the several intermediate accumulators 41–44 and the distance $x$ between the sets of sheaves of the additional accumulator means 51 continuously change but do not change independently of each other. These distances $x$ and $y$ always have with respect to each other the relationship:

$$a \cdot x + b \cdot y = \text{const.}$$

where $a$ is equal to the number of windings present at the intermediate accumulators 41–44 and $b$ equals the number of windings present at the intermediate accumulator means 51. For the case where $$a = b, \quad x + y = \text{const.}$$

As the result of this relationship the star quad twisted by the intermediate accumulator means 51 leaves the latter at a speed $v_0$ which is equal to the speed with which the individual conductors 1 travel from the supply drums 30 to the several intermediate accumulator means 41–44.

In order that the continuously increasing or decreasing extent of accumulation of the intermediate accumulators 41–44 and 51 take place in a fully synchronous manner, it is preferred to arrange the parallel-operating intermediate accumulators 41–44 and the additional intermediate accumulator 51 in a common rigid frame. The change in the extent of accumulation of the conductors at the star quad twisting intermediate accumulator 51 is with such a construction compelled to be opposed to the change in the extent of accumulation of the parallel-operating intermediate accumulators 41–44.

An example of such an embodiment of my invention is shown in FIG. 10. With this embodiment there are a pair of bearing stands 61 and 62 at which the parallel shafts 63 and 64 are supported for rotary movement. A transmission unit 66 is also supported for rotary movement by the stand 62, is driven by the drive 65, and is operatively connected with the shafts 63 and 64 to rotate the latter at the same constant speeds and in the same directions of rotation, respectively. Thus, the transmission 66 can simply include a central shaft situated centrally between the shafts 63 and 64 and having a pair of gears fixed to its opposed ends. The right gear is driven from the drive 65, while the left gear meshes with a pair of identical gears which are fixed coaxially to the shafts 63 and 64, respectively, thus providing in this way a rotation of the shafts 63 and 64 at the same angular speeds and in the same directions.

The pair of rotary shafts 63 and 64 serve to guide for longitudinal movement a frame 75 having non-rotary components formed by a pair of elongated cylindrical sleeves 67 and 68 through which the shafts 63 and 64 slidably extend, these guide sleeves 67 and 68 being fixed at their ends to a pair of support plates 69 and 70 of the frame 75. The shaft 64 is formed at an intermediate part thereof with a pair of coextensive threads which are oppositely directly and cross each other and which join each other at their ends to form a cross thread as was described above for a possible variation of the embodiment of FIG. 4. Thus, during rotary movement of the shaft 64 a pin which is fixed to the sleeve 68 and extends radially therefrom into the threads of the shaft 64 will provide longitudinal movement of the frame 75 back and forth along the shafts 63 and 64. The region where the pair of crossed threads of the shaft 64 join each other are curved so as to provide for a reversal in the direction of movement of the frame 75 which requires a period of a few seconds, so that an abrupt stopping of the frame and acceleration thereof at the reversal points is also avoided with the embodiment of FIG. 10.

The bearing stand 61 carries four supports 71 for four sets of sheaves 72, but FIG. 10 shows only a pair of the supports 71 and sets of sheaves 72. Thus, each of these sets of sheaves 72 is composed of shafts on which a plurality of sheaves are freely turnable individually with respect to each other. The supports 71 are supported for free rotary movement by the bearing stand 61 and they are rotated together with the sets of sheaves 72, respectively, by way of an intermediate drive which is driven from the shaft 63. This intermediate drive is indicated schematically in FIG. 10 just to the left of the vertically extending part of the bearing stand 61. With this drive the carriers 71 and the sheave sets 72 carried thereby are all rotated at the same constant speed of rotation $n_4$ respectively about the longitudinal axes of the supports 71.

At the plate 69 of the frame 75, at the side of this plate which is directed toward the bearing stand 61, there are also four rotary supports 73 for four sheave-sets 74. These support shafts 73, which are respectively coaxial with the shafts 71, are also rotated at the angular speed $n_4$ in such a way that the sets of sheaves 74 always have the same angular orientation as the sets of sheaves 72, respectively. For example, a gear which is slideably keyed on the shaft 63 so as to rotate therewith while being capable of shifting axially therealong transmits a drive from the shaft 63 to a transmission which is connected to the shaft 73 which is shown schematically just to the left of the plate 69 in FIG. 10. The sets of sheaves 72 respectively carried by the rotary support shafts 71 respectively form with the sets of sheaves 74 which are respectively carried by the respectively coaxial support shafts 73 the four intermediate accumulator means 41–44 each of which has a plurality of conductor windings accumulated thereon.

The four conductors 1 which are to be twisted into a quad travel through the bearing stand 61, which is to say through the bearings for the several rotary shafts 71 in the example illustrated in FIG. 10. Then these conductors pass through the intermediate accumulator means 41–44, respectively, and leave the latter through bores which are formed in the plate 69.

As a result of the reciprocating movement of the frame 75 along the shafts 63 and 64 the distance $y$ between the sets of sheaves of each of the accumulator means 41–44 continuously increases and decreases in a periodic manner. As a result of this continuous change in the distance $y$ and as a result of the rotary movement of the intermediate accumulator means 41–44, the desired preliminary torsion in the conductors 1 which are fed to the intermediate accumulator means 51 is achieved.

A rotary shaft 76 is supported for rotary movement at a central portion of the carrier plate 70 of the frame 75, and this rotary shaft 76 supports a set of sheaves 77 of the additional accumulator means 51. In the same way rotary shaft 78, which forms a coaxial extension of the shaft 66, supports for rotary movement a set of sheaves 79 of the intermediate accumulator means 51. Thus, the intermediate accumulator means 51 rotates with the shaft 66 at a constant speed of rotation $n$ with the sheave-sets 77 and 79 forming the intermediate accumulator means 51 which rotates about the common axis of the shafts 76 and 66. It will be noted that the shaft 76 is driven by a transmission from the shaft 63 and shown just to the right of the plate 70 in FIG. 10. This transmission has with respect to the drive of the shaft 78 a relationship which will maintain the set of sheaves 77 angularly oriented at all times at angular positions identical with the angular orientation of the set of sheaves 79.

The conductors 1 which are provided with the preliminary torsion by the intermediate accumulators 41–44 travel through a twisting nipple situated in the bearing which supports the rotary shaft 76 and then reach the intermediate accumulator means 51. These conductors travel through the accumulator means 51 in a plurality of windings and then, in the form of a twisted star quad, travel through a central bore of the shaft 78 and the shaft 66 at a speed $v_0$ to the exterior of the assembly shown in FIG. 10.

The same number of windings are provided in the intermediate accumulators 41–44 and in the intermediate accumulator 51. As a result of the reciprocating motion of the frame 75 there will be an alternating conductor supply from the intermediate accumulators 41–44 to the intermediate accumulator 51 and in the reverse direction from the accumulator 51 to the intermediate accumulators 41–44, without any variations in the speed of travel of the conductors into the structure at the left of the bearing stand 61 and from the structure at the right of the stand 62, so that at the entrance into and at the outlet from the assembly of FIG. 10 all of the conductors have a constant entrance and exit speed $v_0$.

The shafts which carry the sets of sheaves 72, 74, 77 and 79 are respectively supported at one end in cantilever fashion on the rotary support shafts 71, 73, 76 and 78, respectively, so that the sheaves can readily have the cable elements wound thereon from one side of the apparatus in a highly convenient manner by the operator.

As was mentioned above, the shaft 64 is provided at an intermediate portion with cross threads which bring about the reciprocating movement of the frame 75.

In order to provide for different speeds of movement in the different directions of reciprocation of the frame 75, with a given fixed speed of rotation of the plurality of intermediate accumulator means, the left and right hand intersecting threads of the shaft 64 are provided with different pitches, respectively.

I claim:

1. In a cabling device for lay-reversed cabling of elements of a communication cable from one cable group into the next-higher cable group, a plurality of rotary means to which the elements are fed and from which they are withdrawn, a plurality of variable accumulator means for accumulating said elements thereon, each of said variable accumulator means being carried by one of said rotary means for rotary movement therewith in only one direction, said plurality of variable accumulator means being arranged in parallel and respectively coacting with the elements which are to be cabled, a plurality of control means coacting respectively with said plurality of variable accumulator means for controlling the latter to continuously change the extent to which said elements are accumulated thereon in a manner alternately increasing and decreasing the extent of accumulation of said elements at said plurality of accumulator means, respectively, an additional variable accumulator means receiving said elements from said plurality of accumulator means, and an additional control means coacting with said additional accumulator means for continuously changing the extent of accumulation of the elements received by said additional accumulator means in a manner alternately increasing and decreasing the latter extent of accumulation, each of said accumulator means which are arranged in parallel acting on only a single conductor which forms one of said elements to provide a given torsion in said conductor.

2. In a cabling device for lay-reversed cabling of elements of a communication cable from one cable group into the next-higher cable group, a plurality of rotary means to which the elements are fed and from which they are withdrawn, a plurality of variable accummulator means for accumulating said elements thereon, each of said variable accumulator means being carried by one of said rotary means for rotary movement therewith in only one direction, said plurality of variable accumulator means being arranged in parallel and respectively coacting with the elements which are to be cabled, a plurality of control means coacting respectively with said plurality of variable accumulator means for controlling the latter to continuously change the extent to which said elements are accumulated thereon in a manner alternately increasing and decreasing the extent of accumulation of said elements at said plurality of accumulator means, respectively, an additional variable accumulator means receiving said elements from said plurality of accumulator means, and an additional control means coacting with said additional accumulator means for continuously changing the extent of accumulation of the elements received by said additional accumulator means in a manner alternately increasing and decreasing the latter extent of accumulation, a single frame means carrying and being common to said plurality of accumulator means and said additional accumulator means.

3. In a cabling device for lay-reversed cabling of elements of a communication cable from one cable group into the next-higher cable group, a pair of rotary means to which the elements are fed and from which they are withdrawn, a pair of variable accumulator means for accumulating said elements thereon, each of said variable accumulator means being carried by a respective one of said rotary means for rotary movement therewith at mutually different angular velocities, and a pair of control means each coacting respectively with one of said pair of variable accumulator means for controlling the latter to continuously change the extent to which said elements are accumulated thereon in a manner alternately increasing and decreasing the extent accumulation of said elements at said pair of accumulator means, respectively, the change in extent of accumulation at one of said pair of variable accumulator means being equal and opposite to the change in extent of accumulation at the other of said pair of variable accumulator means.

4. The combination of claim 3 wherein said pair of variable accumulator means are rotatable respectively in opposite rotary directions.

References Cited

UNITED STATES PATENTS

| | | |
|---|---|---|
| 338,244 | 3/1886 | Briggs. |
| 1,826,758 | 10/1931 | Field _____ 74—58 XR |
| 2,009,141 | 7/1935 | Lippitt _____ 242—158.3 XR |
| 3,025,656 | 3/1962 | Cook _____ 57—34 |
| 3,373,549 | 3/1968 | Shaw _____ 57—34 |
| 3,373,550 | 3/1968 | Symonds _____ 57—34 |

FOREIGN PATENTS

| | | |
|---|---|---|
| 1,346,502 | 11/1963 | France. |
| 1,447,458 | 6/1966 | France. |

MERVIN STEIN, Primary Examiner

W. H. SCHROEDER, Assistant Examiner

U.S. Cl. X.R.

57—63, 91